United States Patent Office 3,503,231
Patented Mar. 31, 1970

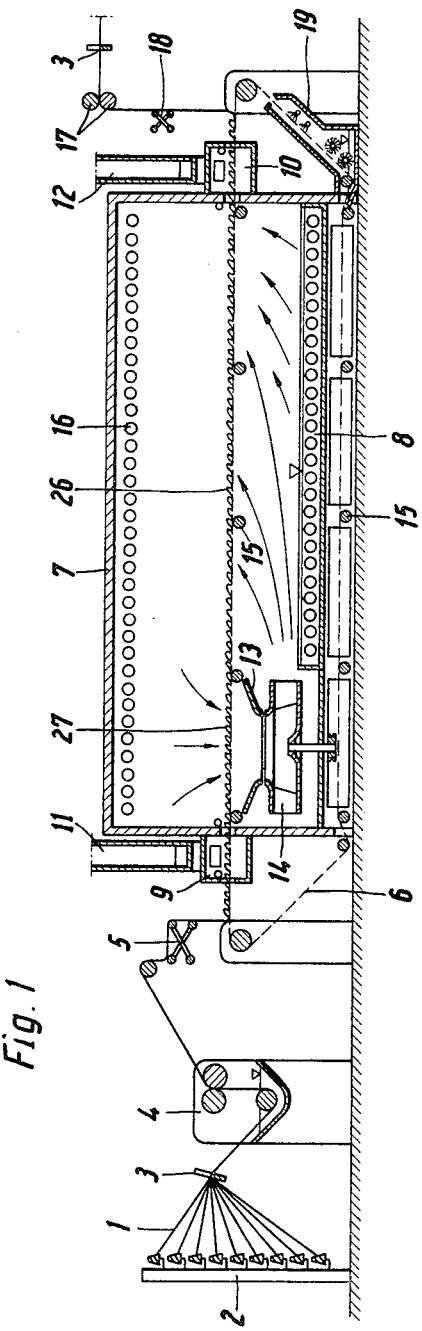
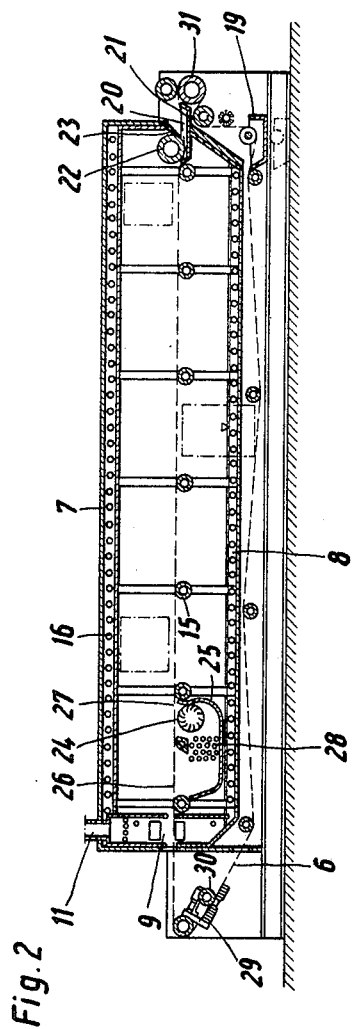

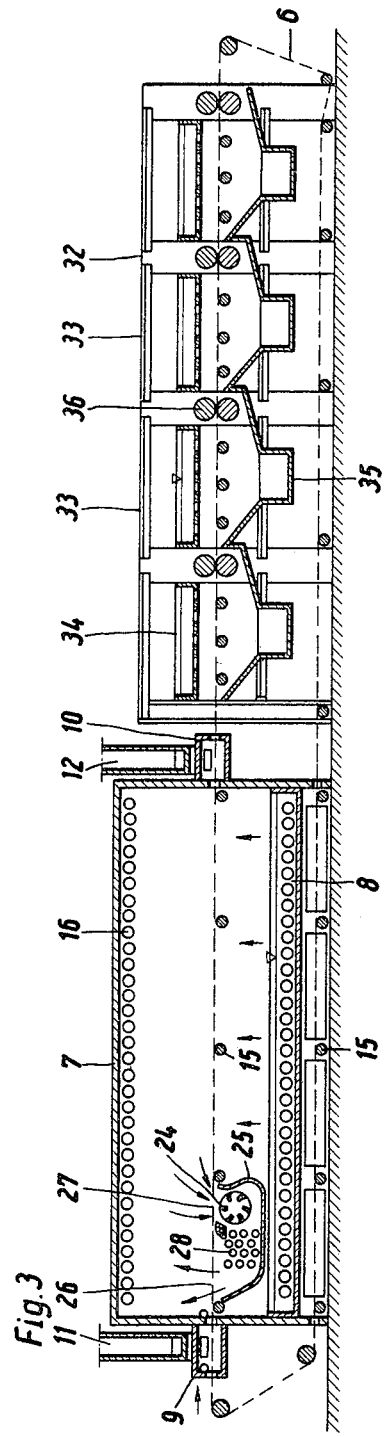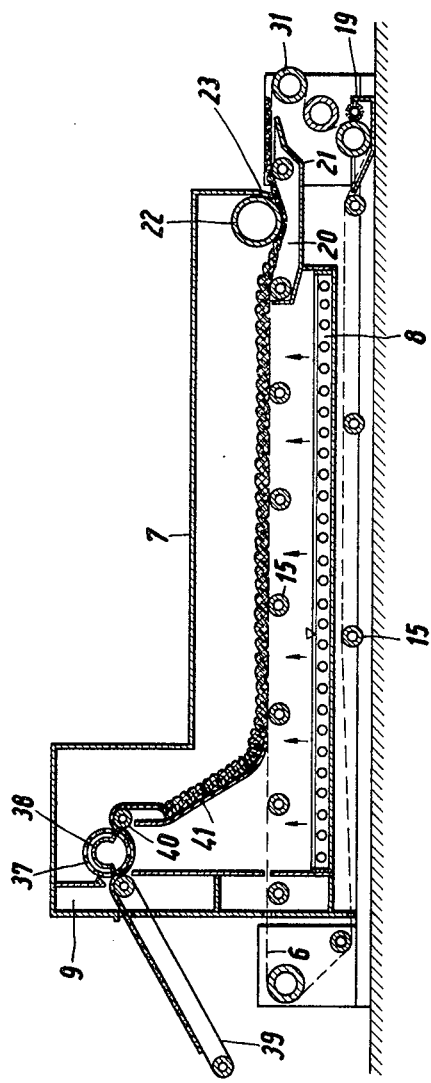

3,503,231
APPARATUS FOR THE STEAM TREATMENT OF MATERIALS
Heinz Fleissner and Gerold Fleissner, Egelsbach, near Frankfurt am Main, Germany, assignors to Vepa AG, Basel, Switzerland
Filed July 24, 1967, Ser. No. 655,549
Claims priority, application Germany, July 22, 1966, V 31,559; Aug. 20, 1966, V 31,757; Sept. 21, 1966, V 31,982; Sept. 24, 1966, V 32,013; Mar. 25, 1967, V 33,317
Int. Cl. D06c 1/06
U.S. Cl. 68—5          10 Claims

ABSTRACT OF THE DISCLOSURE

The present disclosure relates to process and apparatus for the steaming of materials, for example textile materials, as applied to shrinking, dyeing, bleaching, setting, finishing and similar treatment processes. The apparatus of the present disclosure includes at least one treatment chamber and a steam-permeable conveying means, preferably a conveyor belt made of a metal cloth and/or at least one sieve drum, which is used to guide the material being treated through the treatment chamber.

BACKGROUND OF THE INVENTION

The present invention relates to a process and apparatus for the treatment of materials, for example textile materials, wherein the apparatus includes at least one treatment chamber and a steam-permeable conveying means, preferably a conveyor belt made of a metal cloth and/or at least one sieve drum means, on which the textile material is guided through the treatment chamber.

More particularly, the present invention concerns a steaming process and apparatus as can be particularly applied to shrinking, dyeing, bleaching, setting, finishing and similar types of treatment processes.

Devices are well known in which the textile material is passed through the treatment chamber on sieve drums subjected to a suction draft. Furthermore, devices are well known in which one or several conveyor belts are provided as conveying means. In devices using sieve drums subjected to a suction draft, the textile material is intensely penetrated by the treatment medium. However, in these devices only a relatively small material quantity can be accommodated in the treatment chamber. Thus, for treatments which require longer treatment times, a device using sieve drums is only effective to a limited degree. When using conveyor belts as the conveying means, the material being treated can be piled up in a layer of any desired thickness. However, the contact of the material with the treatment medium is not sufficient and accordingly the treatment effect varies.

SUMMARY OF THE INVENTION

An object of the present invention is to avoid the prior art disadvantages in the steam-treatment of materials, for example, textile materials.

Another object of the present invention is to provide an improved process and apparatus for the steam-treatment of textile materials wherein materials which require longer treatment times can be effectively treated while still providing sufficient contact of said material with the treatment medium.

A further object of the present invention is to provide an improved process and apparatus for the treatment of textile materials wherein textile materials in any form, for example flock, slivers, tow, yarn or piece-goods can be effectively treated.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the steam-treatment of textile materials may be obtained by associating with the conveying means a shock-treatment means, for example, a blower means which passes the treatment medium flow through the material being treated and the conveying means at the inlet of the treatment chamber. Especially with steaming treatments, a shock-like and completely uniform heating up of the material can be readily obtained followed by further passage through the treatment chamber where the material simply dwells in the treatment atmosphere before removal from the apparatus. It is advantageous to use as a conveying means a steam-permeable conveyor belt which extends out of the treatment chamber at the inlet and/or the outlet of the apparatus and which is returned to the inlet end preferably from outside the treatment chamber.

In some treatment processes, especially in dyeing processes, soiling of the conveying means occurs as a result of continual operation. Thus the apparatus must be stopped from time to time for cleaning. In order to avoid soiling, it is suggested to provide a cleaning means for the conveyor belt at that portion of the conveyor belt which is not covered with the material being treated, and preferably near the outlet of the apparatus. A drying device may be arranged behind the cleaning device so that the conveyor belt can be cleaned and dried in each cycle.

In order to produce a steam atmosphere which contains as little air as possible, it is desirable to provide at the inlet and possibly also at the outlet of the apparatus a housing subjected to a suction draft. However, a water seal may be also arranged at the outlet of the apparatus for sealing the treatment chamber. In order to pass even loose stock or textile material which tends to become entangled, properly through the water seal, it is furthermore suggested to transport the textile material through said water seal while it is guided at both sides thereof. For the bilateral guidance of the material, another endless conveying element, for example a conveyor belt or a roller, may be provided which, under an initial stress, rests against the material to be treated. Also, a rapid and complete heating up of the textile material can be effected in the steaming chamber by providing near the inlet of the apparatus and beneath the conveyor belt a suction means and/or a blower box containing a blowing means.

When treating materials which are only slightly permeable to air or steam, and in order to obtain a high degree of production, it is in many cases advantageous to arrange at least one sieve drum means subjected to a suction draft in the steaming chamber to provide a uniform and shock-like heating up of the material being treated. The material is fed to the sieve drum by means of a separate conveyor belt. It is desirable if the conveyor belt at the inlet of the apparatus is steam-permeable and possibly passed around at least one drum.

For the treatment of yarn and other materials which are very permeable to steam, it is sufficient to arrange at least one cross-current blower underneath the steam-permeable conveying means in the treatment chamber and extending preferably over the entire working width of said conveying means. Accordingly, it is also advantageous if the suction zone and/or the pressure zone of the housing of the cross-current blower extends to the belt-like conveying means. Furthermore, the cross-current blower can be provided with a heating means which is preferably arranged in the housing of said cross-current blower.

An effective sealing of the outlet of the apparatus is effected by means of a water lock. In order to provide for the passage of loose fibrous material through this water seal, a roller can be provided as an immersion means which directs the material and the conveying element through the liquid of the water seal, said roller means being sealed against the housing and frequently provided with a perforated, liquid-permeable jacket. If a perforated, liquid-permeable roller is utilized, the water seal may be designed as a rinse or wash bowl, for example by subdividing the trough-like liquid container of the water seal beneath the roller means. For example, in one part of the liquid container a liquid supply may be provided and in the other part a liquid drain may be provided. Thus the liquid flows twice through the material and the perforated roller. In order to obtain a proper passage of loose fibrous stock, yarn and the like through the water seal, it is suggested to immerse the roller of the water seal in the liquid to less than one half of the roller radius, and to rate the roller diameter in such a way that the squeezing angle between the belt-like conveying means and the roller is equal to or less than 30.

According to another essential feature of the present invention and especially for a textile material which consists of flock, slivers, tow, yarn and the like which can be plaited on the conveyor belt of the steaming chamber, it is suggested to combine the steaming chamber with other treatment units, for example washing and/or drying means. For example, the treatment units can be provided with one common endless, liquid and gas-permeable conveying means, for example a conveyor belt, as the conveying element for all of the treatment units. In this way a tensionless material guidance through the individual treatment devices is insured and at the same time, entangling, felting or other detrimental influences on the textile material when it is passed from one treatment device to the next one are substantially eliminated.

For achieving a high production when a thick material layer is to be handled on the conveyor belt of the steaming apparatus, it is expedient to provide above the conveyor belt at the inlet of the treatment chamber another conveying means which is penetrated by the treatment medium, for example a sieve drum, a wire-mesh belt or a vibrating chute and to drive this second conveying element at a much higher speed than the conveyor belt traversing the treatment chamber. On this conveying means which is penetrated by the steam a thin layer of the textile material can be fed, penetrated by the steam and deposited on the conveyor belt which traverses the steaming chamber in a thick layer after having been heated-up. With an apparatus provided with a sieve drum subjected to a suction draft and arranged above the conveyor belt for heating up the material, it is expedient to provide as a feeding unit in front of this sieve drum a steam-permeable conveyor belt. This conveyor belt is passed through an antechamber which is provided with a circulating means and/or an exhaust means. The conveyor belt of the steaming apparatus is also passed through this antechamber. A deflector roll and a chute which extends to the conveyor belt which passes through the treatment chamber may be correlated to the sieve drum arranged above the wire-mesh belt. However, it is also possible to let the material, for example the loose fibrous stock, drop onto the wire-mesh conveyor means directly and to dispose of the chute. When using a chute it is advantageous to pass the material over the lower portion of the sieve drum, whereas when using a sieve drum without a chute connected therebehind, it is more desirable to pass the material over the upper portion of the sieve drum. The portion of the sieve drum covered by the material being treated is subjected to a suction draft, and at that portion of the drum which is not covered with the material being treated the suction draft is interrupted by means of a baffle.

It is also possible to arrange a folding device instead of a sieve drum above the conveyor belt in the treatment chamber. It is expedient to amount the folding device in an additional housing which is set up, as a constructural unit, on top of the steamer housing, and which may be connected with said steamer housing in a steam-type manner. Also, when using a sieve drum for the shock-like heating up of the material, said sieve drum should be accommodated in a separate constructural unit which may be mounted in a steam-type manner to the steamer housing. By such an arrangement it is possible to modify only the separate constructural unit for heating up the material without effecting the steaming device and thus the steaming device can be used as such. When using the embodiment comprising a sieve drum subjected to a suction draft, the treatment chamber is provided with two material inlets with one common antechamber, so that it is possible to feed the material directly onto the conveyor belt which traverses the treatment chamber and thus to bypass the sieve drum and the appertaining inlet belt. This application is of particular interest when handling printed textile material, where steaming and thus contamination of the material by the conveying means must be avoided. The appaartus according to the present invention is particularly suited for the treatment for example for shrinking, dyeing, bleaching, setting washing, finishing and the like of loose, endless fibrous and thread-like materials, such as for example yarn. According to the present invention endless lengths of a plurality of yarn threads can be lined up in a parallel, side by side relationship and preferably folded in the lengthwise direction onto the conveying element of the treatment apparatus and subsequently subjected in this condition to one or several treatments, for example to steaming, washing, and/or drying, and the like.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIGURE 1 is a longitudinal section of the steaming apparatus of the present invention which can be utilized for the treatment of yarn and other textile materials;

FIGURE 2 is a longitudinal section of a steaming apparatus of the present invention similar to that of FIGURE 1 and utilizing a cross-current blower means;

FIGURE 3 is a longitudinal section of a combined apparatus for the steaming and washing of materials, for example textile materials; and FIGURE 4 is a longitudinal section of a steaming apparatus of the present invention utilizing a conveyor belt provided with a suction drum.

DESCRIPTION OF THE PREFERRED EMBODIMENTS

Referring now to the drawings wherein like reference numerals are used throughout the various views to designate like parts, the apparatus of the present invention comprises a plurality of yarn threads 1 drawn off of a bobbin carrier 2 and combined by a rake 3 into a length of material. The yarn threads are then passed as a length through a padder 4. For the application of the treatment liquor a printing device (not shown) can also be used instead of the padder or in addition to the padder. By means of a folding device 5 the yarn threads 1 are deposited onto a wire-mesh belt 6. By folding the material it is possible to accommodate, for example, about a 20 to 50-fold yarn quantity and even more on the conveyor belt. The steamer has a heat-insulated housing 7 with a heated sump 8 for the generation of saturated steam at the bottom of the housing. The wire-mesh belt 6 extends out of the treatment chamber at the inlet and also at the outlet of the apparatus and is returned to the inlet underneath the bottom of the housing. An antechamber 9 subjected to a suction draft and a chamber 10 at the end of the steamer insures an air-free steam atmosphere in the steamer, since the steam-air mixture in chambers 9 and 10 is exhausted laterally through a duct 11 and/or 12. For a rapid heating up of the textile material, in this case for heating up the yarn threads 1, a suction box 13 with a fan means 14 is provided beneath the wire-mesh conveyor 6. The wire-mesh conveyor 6 is guided on rollers 15. A heating means 16 in the ceiling of the housing prevents the formation of condensate.

If, as shown in this embodiment of the present invention, the material being treated is to be unfolded after the treatment process, this can be accomplished by drawing off the yarn threads 1 by means of a pair of rolls 17. In order to facilitate unfolding of the material, the yarn threads may be caused to swing, for example by means of a rotating element 18.

For the continuous cleaning of the wire-mesh belt 6 a washing device 19 is provided at the outlet of the apparatus. The washing device may be provided with spray tubes which spray the washing liquor against the wire-mesh belt as well as with one or several brushing rollers. An exhaust device and/or a drying device may be provided behind the washing device. However, for drying the wire-mesh belt the bottom of the steaming chamber may also be used if said bottom is not heat-insulated.

The embodiment according to FIGURE 2 is of similar design as that of FIGURE 1. Accordingly the same elements are marked with the same numbers. In this embodiment of the present invention an antechamber 9 subjected to a suction draft is provided at the inlet, whereas the outlet of the apparatus is sealed by means of a water lock 20 which consists of a trough 21 filled with liquid and a roller means 22 which functions to immerse the wire-mesh belt 6 and the material being treated in the liquid of the water lock. The roller is sealed against the housings 7 by means of an element 23 resting against the roller. For a rapid heating up of the material in this device, a cross-current blower 24 is disclosed beneath the wire-mesh belt. The housing 25 of the cross-current blower extends in close proximity to the wire-mesh belt and provides said belt with a blowing zone 26 and a suction zone 27. For heating up the recirculated steam a heater battery 28 is disposed in the housing 25.

In order to avoid a lateral displacement of the wire-mesh belt 6, the belt is provided with a belt control instrument 29 with swiveling roller means 30 located beneath the inlet end of the apparatus. The wire-mesh belt 6 is driven by means of a deflector roll 31 at the outlet of the apparatus. By adjusting the drive at the outlet of the apparatus the tensioning of the wire-mesh belt can be readily facilitated.

The apparatus shown in FIGURE 3 is a combination of a conveyor belt steamer and a conveyor belt washing machine 32. The design of the conveyor belt steamer essentially corresponds to that of the embodiments according to FIGURES 1 and 2. The wire-mesh belt 6 is also passed through the washing machine so that the material deposited on the wire-mesh belt can be transported through said washing machine without altering the material deposition. The washing machine 32 consists of four treatment zones 33. The washing liquor flows out of rinsing boxes 34 onto and through the textile material, is collected in collecting tanks 35 arranged underneath the wire mesh belt and returned into the rinsing boxes 33 by means of pumps (not shown). When being passed from one treatment zone to the next treatment zone, the material can be dehydrated by means of a pair of squeeze rollers 36. By subdividing the washing machine into several treatment zones, it is possible to use it for rinsing, washing, and possibly for applying a finishing agent. Thus, it is possible to work with several treatment liquors. It is also sometimes desirable to provide a conveyor belt dryer (not shown) behind the conveyor belt steamer and to pass the wire-mesh belt 6 through this dryer.

In the embodiment of the present invention according to FIGURE 4, a sieve drum 37 subjected to a suction draft is provided above the wire-mesh belt for the shock-like heating up of the material to be treated. The suction draft is interrupted at that portion of the sieve drum which is not covered with the material being treated by means of a baffle means 38 arranged inside the sieve drum. The textile material is fed to the sieve drum 37 by means of a conveyor belt 39 which is also passed through the antechamber 9 subjected to a suction draft and drops via a deflector roll 40 onto a chute 41 from where it is transported in a folded condition onto the wire-mesh belt 6.

Although the apparatus of the present invention is primarliy directed to steam-treating applications it is readily apparent that other treatment processes can also be performed in this apparatus.

The materials which can be treated by the apparatus of the present invention include any of the natural or synthetic fibers. The natural fibers can include cotton, wool, silk, cellulose, etc., and the synthetic fibers may comprise synthetic polymers such as polyolefins, e.g., polyethylene, polypropylene, etc., polyamides, e.g., Nylon 6 obtained by the condensation of caprolactam, Nylon 66 obtained by the condensation of hexamethylenediamine with adipic acid, etc., polyesters, e.g., polyethylene terephthalate, etc., phenolic resins, e.g., phenol formaldehyde resins, urea formaldehyde resins, etc., polyvinyl materials, e.g., polyvinyl chloride, polyvinyl acetate, etc., acrylate resins, e.g., polymethylmethacrylate, copolymers of these materials with one another or with ethylenically unsaturated monomers, and similar type polymers. The apparatus of the present invention is also applicable to blends of the above-mentioned textile materials.

The invention being thus described, it will be obvious that the same may be varied in many ways. Such variations are not to be regarded as a departure from the spirit and scope of the invention, and all such modifications are intended to be included within the scope of the following claims.

We claim:

1. An apparatus for the treatment of textile materials which comprises at least one steam-treatment chamber, a steam-permeable conveying means disposed in said treatment chamber, means for introducing the material to be treated to said conveying means, shock-like blower means disposed under the conveying means at the inlet end of the treatment chamber for drawing the treatment medium through both the material being treated and the conveying means, steam-generating means disposed in the lower portion of the treatment chamber near the floor of said chamber, heating means disposed in the upper portion of the treatment chamber and outlet means for removing the treated material from the steam-treatment chamber.

2. The apparatus of claim 1, wherein the conveying means is a steam-permeable conveyor belt.

3. The apparatus of claim 2, wherein the conveyor belt is returned from the outlet to the inlet beneath the treatment chamber and near said chamber floor, the heat radiating from the non-insulated floor functioning to dry and preheat the conveyor belt as it is returned to the inlet of the treatment chamber.

4. The apparatus of claim 3, wherein the conveyor belt extends out of the steam-treatment chamber at the inlet and outlet of said chamber.

5. The apparatus of claim 2, wherein a cleaning means for the conveyor belt is disposed near the outlet of the treatment chamber at that portion of the conveyor belt which is not covered with the material being treated.

6. The apparatus of claim 1, wherein the blower means is disposed in a suction box.

7. The apparatus of claim 1, wherein the steam-generating means is a water sump.

8. The apparatus of claim 1, wherein a folding means is provided at the inlet of the treatment chamber which feeds the material to be treated to the conveyor belt in a folded state.

9. The apparatus of claim 1, wherein a housing subjected to a suction draft is associated with the conveyor belt at the inlet of the treatment chamber.

10. The apparatus of claim 1, wherein a housing subjected to a suction draft is associated with the conveyor belt at the outlet of the treatment chamber.

References Cited

UNITED STATES PATENTS

| | | | |
|---|---|---|---|
| 2,833,136 | 5/1958 | Prince et al. | 68—5 |
| 2,899,264 | 8/1959 | Griffiths et al. | 68—5 X |
| 3,056,275 | 10/1962 | Williams | 68—5 X |
| 3,099,146 | 7/1963 | Yamawaki | 68—5 X |
| 3,074,261 | 1/1963 | Wilcox | 68—5 |

FOREIGN PATENTS

| | | |
|---|---|---|
| 131,338 | 2/1949 | Australia. |
| 458,009 | 6/1950 | Italy. |
| 559,370 | 3/1957 | Italy. |

WILLIAM I. PRICE, Primary Examiner